J. KREHBRIL.
Potato Planter.
No. 103,058.
Patented May 17, 1870.
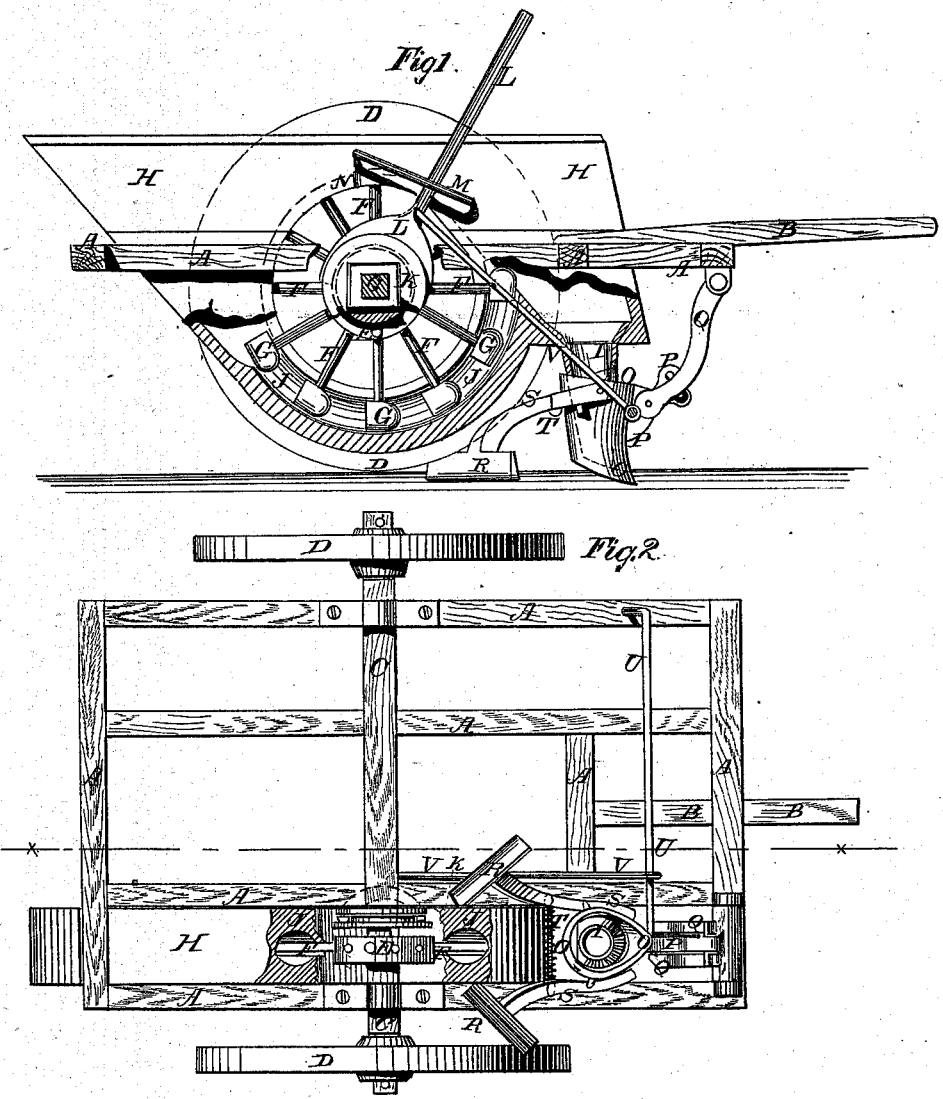

United States Patent Office.

JOHN KREHBRIL, OF CLARENCE CENTRE, NEW YORK.

Letters Patent No. 103,058, dated May 17, 1870.

IMPROVEMENT IN POTATO-PLANTER.

The Schedule referred to in these Letters Patent and making part of the same.

To all whom it may concern:

Be it known that I, JOHN KREHBRIL, M. D., of Clarence Centre, in the county of Erie and State of New York, have invented a new and useful Improvement in Potato-Planter; and I do hereby declare that the following is a full, clear, and exact description thereof, which will enable others skilled in the art to make and use the same, reference being had to the accompanying drawings forming part of this specification.

Figure 1 is a detail sectional view of my improved planter, taken through the line $x\ x$, fig. 2, part being broken away to show the construction.

Figure 2 is an under-side view of the same, part being broken away to show the construction.

Similar letters of reference indicate corresponding parts.

My invention has for its object to furnish a simple and convenient machine, by means of which potatoes may be dropped and covered rapidly, thoroughly, and regularly, and in such a way as to mark the ground, so that the planting may be done with exactness and uniformity; and It consists in the construction and combination of the various parts of the machine, as hereinafter more fully described.

A is the frame of the machine, to the forward part of which the tongue B is securely attached, and in bearings attached to which the axle C revolves.

D are the wheels, one or both of which are securely attached to the axle C, so as to carry the said axle with them in their revolutions.

E is a hub or sleeve, working loosely upon the axle C.

To the hub E are attached radial arms F, a greater or lesser number of which may be used, according as it is desired to have the potatoes dropped closer together or further apart.

To the outer ends of the radial arms F are attached cups G, of such a size as to contain one large potato or two small ones.

H is the box or hopper, the bottom of which is made in the form of an arc of a circle, and is slotted longitudinally for the passage of the radial arms F. The potatoes are to be placed in the rear part of the box or hopper H, and in the bottom of said rear part is formed an opening for the cups G to rise through in entering the hopper.

As the cups G rise into the rear part of the hopper H they take up a potato, carry it over the arched bottom, and discharge it into the forward part of the hopper, which is so formed as to guide the potato into the spout I, by which it is conducted to the ground.

The part of the arched bottom of the hopper H that enters the forward part of said hopper is made inclined, so that the potatoes may pass freely to the spout I.

In the lower part of the inclined portion of the said bottom is formed an opening for the egress of the cups G, as they pass around through the curved channel J, to again rise through the rear part of the hopper.

The channel J is made close, so that the potatoes that may drop into it cannot escape to the ground, but will be forced out by the advance of the cups G.

K is a clutch sliding upon the axle B, and carried around with said axle in its revolution, so that, when the clutch K is thrown into gear with the hub E, the said hub, with its attached arms and cups, may be carried around by and with the axle C.

L is the clutch-lever, the forked lower end of which rides in a groove in the clutch K, and its upper end passes up through a keeper, M, attached to the side of the hopper H.

N is an inclined block attached to the side of the hopper H, so that, when the upper end of the lever L is moved rearward, the said block N will move it outward and throw the clutch K out of gear with the hub E.

When the upper end of the lever L is moved forward, the keeper M will force it, at the same time, inward, throwing the clutch K into gear with the hub E.

O is the plow by which the furrow is opened to receive the potatoes, and which is made tubular to receive the conductor-spout I, so that the potatoes may be deposited in the bottom of the furrow before said furrow has had time to partially fill by the falling in of the soil.

To the forward side of the upper part of plow O is attached, or upon it is formed, an arm, P, the forward end of which enters a slot in the lower end of the draft-arm Q.

The upper end of the arm Q has a cross-head formed upon or attached to it, the ends of which cross-head are securely pivoted to the forward part of the frame A.

The lower or slotted end of the arm Q is pivoted to the arm P by a bolt or pin passing through said parts.

The arms P and Q are kept from moving upon each other, when adjusted in place, by pins passed through the arm Q upon both sides of the forward end of the arm P, as shown in fig. 1.

R are the coverers which are attached to the rear ends of the arms S, the forward ends of which are pivoted to the tubular opening plow O.

The arms S are connected to each other by a coiled or equivalent spring, T, so that the said arms may give or spread apart to allow the coverers R to pass obstructions. The arms S are left free to rise to pass obstructions, but are kept from dropping too low by pins or other stops attached to the said tubular opener O.

The opening and covering-plows are connected with the clutch-lever I by the rods U V, so that, when the said lever is operated to throw the dropping device out of gear with the axle, the same movement may, at the same time, raise the said opening and covering-plows from the ground.

Having thus described my invention

I claim as new and desire to secure by Letters Patent—

1. The sleeve or hub E, arms F, and cups G, in combination with the axle C, slotted arched bottom of the hopper H, and conducting-spout I, substantially as herein shown and described, and for the purpose set forth.

2. The combination and arrangement of the tubular opening-plow O P Q and coverers R S, with the conductor-spout I and frame A, substantially as herein shown and described, and for the purpose set forth.

3. The combination of the opening-plow O, coverers R, clutch-lever L, clutch K, block N, and keeper M, substantially as and for the purpose specified.

J. KREHBRIL, M. D.

Witnesses:
O. W. SPELMAN,
T. A. HOPKINS.